United States Patent [19]

McFarland

[11] Patent Number: 4,671,729
[45] Date of Patent: Jun. 9, 1987

[54] WHEELCHAIR LOADING APPARATUS

[76] Inventor: Robert E. McFarland, 8301 Northwest 39th Expressway, Bethany, Okla. 73008

[21] Appl. No.: 761,427

[22] Filed: Aug. 1, 1985

[51] Int. Cl.⁴ .......................... B60P 1/44; B60R 5/04
[52] U.S. Cl. ...................................... 414/462; 410/3; 414/546; 414/554; 414/917; 414/921
[58] Field of Search ............... 414/462, 546, 549, 553, 414/554, 556, 917, 921; 410/3, 4, 6, 7, 19, 22, 30, 51; 224/42, 44

[56] References Cited

U.S. PATENT DOCUMENTS

| Re. 31,178 | 3/1983 | Deacon . | |
|---|---|---|---|
| 2,492,841 | 12/1949 | Burkey | 414/462 |
| 3,362,547 | 1/1968 | Kovarik | 414/556 |
| 3,627,158 | 12/1971 | Kobasic . | |
| 3,800,967 | 4/1974 | Kosecoff . | |
| 3,843,001 | 10/1974 | Willis | 414/462 |
| 3,893,697 | 7/1975 | Blitz et al. | 414/917 X |
| 4,029,223 | 6/1977 | Adamski et al. | 414/546 |
| 4,032,167 | 6/1977 | Chereda | 410/3 |
| 4,058,228 | 11/1977 | Hall | 414/549 |
| 4,073,395 | 2/1978 | Clement . | |
| 4,127,200 | 11/1978 | Mann . | |
| 4,213,729 | 7/1980 | Cowles et al. . | |
| 4,251,178 | 2/1981 | Bourgraf et al. . | |
| 4,297,069 | 10/1981 | Worthington . | |
| 4,400,129 | 8/1983 | Eisenberg et al. . | |
| 4,406,574 | 9/1983 | Riley . | |
| 4,407,624 | 10/1983 | Kingston | 414/546 |
| 4,411,580 | 10/1983 | Kelly . | |
| 4,456,421 | 6/1984 | Robson . | |
| 4,475,762 | 10/1984 | DeLong et al. | 410/19 X |
| 4,479,752 | 10/1984 | Todd . | |
| 4,573,854 | 3/1986 | McFarland | 414/462 |

FOREIGN PATENT DOCUMENTS 2429690 2/1980 France ................. 414/554

OTHER PUBLICATIONS

Invacare Corporation Brochure Form No. 83–117.
Amigo Sales, Inc. Sales Brochure for The Amigo Trunk Lift.
Ricon Sales, Inc., Sales Brochure for Ricon R30A Wheelchair Lift.

Primary Examiner—Leslie J. Paperner
Attorney, Agent, or Firm—Laney, Dougherty, Hessin & Beavers

[57] ABSTRACT

An apparatus for loading a scooter-type wheelchair or similar object into a vehicle compartment such that the apparatus and wheelchair loaded thereon are fully contained within the vehicle when in a storage position. The apparatus includes a frame attachable to a lower surface of the vehicle compartment and a platform upon which the wheelchair may be rolled. A pair of upper links and a pair of lower links interconnect the frame and platform. A drive shaft interconnects the lower links, and the shaft may be rotated by an electric motor. Each upper link has a drive shaft which is connected to the first link drive shaft by a chain and sprocket assembly. Thus, as the motor rotates the lower link drive shaft, all links are rotated which raises the platform and wheelchair upwardly, traversing toward the vehicle compartment and lowering the platform and wheelchair into the compartment for storage. During this cycle, the platform passes through a vertical plane defining a maximum elevation. The platform includes wheel locators and positioning plates for locating the wheels of the wheelchair as it is positioned on the platform and for preventing the wheelchair from undesired movement once loaded.

42 Claims, 10 Drawing Figures

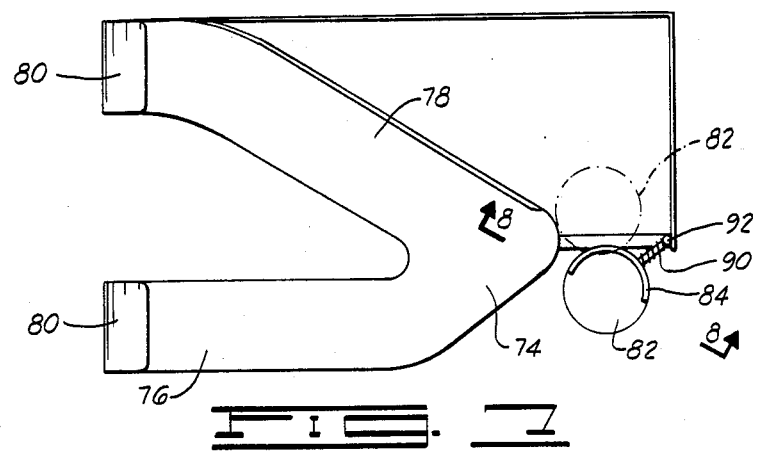
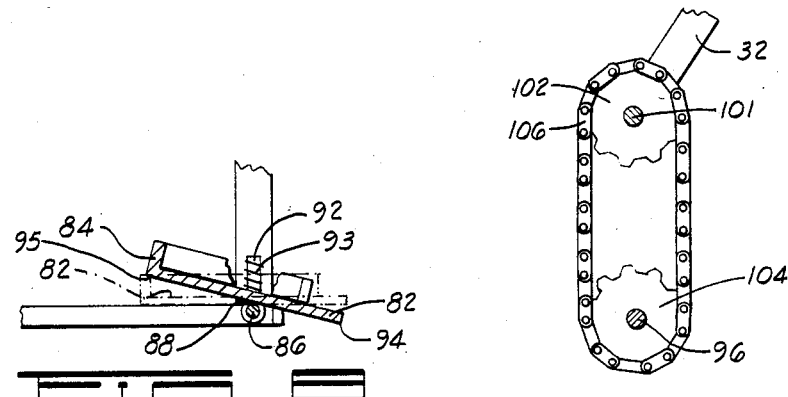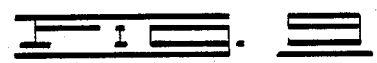
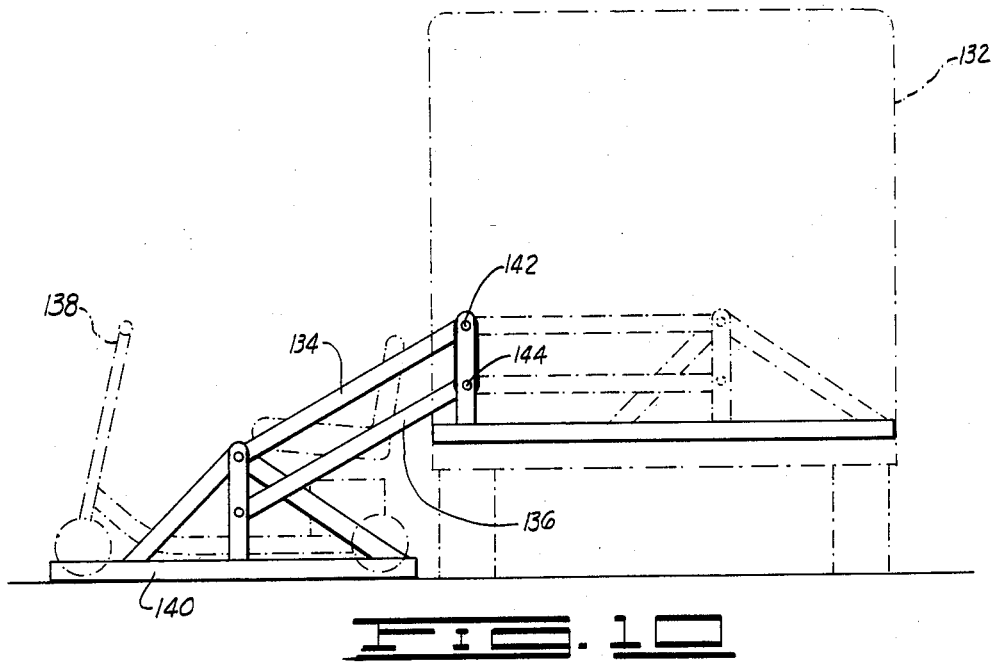

WHEELCHAIR LOADING APPARATUS

BACKGROUND OF THE INVENTION

1. Field of the Invention

This invention relates to apparatus for loading wheelchairs, particularly of the scooter type, or similar objects into a vehicle, and more particularly, to an apparatus having a storage position fully contained within the vehicle.

2. Description of the Prior Art

In the prior art, numerous methods are utilized for loading scooter-type wheelchairs into a vehicle. One such device utilizes a cantilevered hoist-like device which extends rearwardly from the trunk of a car, and has a cable extending downwardly therefrom for attachment to the wheelchair. Such devices can be power-operated so that the cable is pulled upwardly. When raised to a sufficient height, the cantilevered arm is pivoted toward the trunk and the arm and wheelchair are lowered into the trunk. Such a device takes a certain degree of strength to operate, and thus is not suitable for many handicapped persons to manage alone.

A wheelchair loading apparatus which uses a pair of pivoted arms is disclosed in U.S. Pat. No. Re. 31,178 to Deacon. In this apparatus, a platform upon which a wheelchair may be loaded, with an occupant still in place thereon, is adapted to load through the rear or side opening of a van or similar vehicle. The device raises the platform level to the van floor, so that the occupant may then roll the wheelchair into the vehicle. The loading apparatus then collapses so that the doors of the vehicle may be closed. This is distinguishable from the present invention which raises a wheelchair up and passes through a vertical plane defining a maximum height and then lowers the chair to a storage position within the vehicle.

Another apparatus which uses a pair of arms to raise a platform level with the floor of a vehicle is shown in U.S. Pat. No. 4,456,421 to Robson. However, in Robson, the wheelchair must be rotated 90° to be stored. This is unacceptable for scooter-type wheelchairs.

None of the prior art discloses an apparatus by which a wheelchair may be lifted, traversed toward a compartment in the vehicle and then lowered to a storage position within the compartment while maintaining the apparatus in a horizontal plane.

SUMMARY OF THE INVENTION

The wheelchair loading apparatus of the present invention comprises a frame adapted for attachment to a vehicle, a platform for holding a wheeled object such as a scooter-type wheelchair and having a loading position adjacent the vehicle along a ground surface and further having a storage position within the vehicle, and linkage means pivotally connected to the frame and platform, whereby during a loading cycle, the platform and wheeled object loaded thereon are raised from the loading position, traversed toward the vehicle, crossing a vertical plane defining a maximum elevation, and then lowered to the storage position, all while maintaining the platform in a horizontal position. The raising, traversing and lowering movements are accomplished as a substantially continuous motion of the linkage means. The cycle is reversible for unloading.

The linking means comprises an upper link having a frame end pivotally connected to the frame and a platform end pivotally connected to the platform and a lower link vertically and horizontally spaced from the upper link and having a frame end pivotally connected to the frame at a position below the frame end of the upper link and a platform end pivotally connected to the platform at a position below the platform end of the upper link. The links rotate through an angle greater than 180° during a loading cycle.

A drive shaft is connected to the frame end of one link such that the link is rotatable by turning the shaft, as by a motor. Another drive shaft is attached to the frame end of the other link, and transmission means operatively interconnecting the link drive shafts is utilized such that both links are rotatable concurrently.

Control switching means is used to start and stop a reversing motor for a loading or unloading cycle, and at least one limit switch is used to automatically stop the motor when the platform reaches the loading position during an unloading cycle or the storage position during a loading cycle. Counterbalance means in the form of at least one torsion spring is utilized to counterbalance the platform to reduce the power required to move the loaded platform during a loading or unloading cycle. The counterbalance spring helps eliminate looseness and vibration, thus providing positive control and predictable movement during a loading or unloading cycle.

An important object of the present invention is to provide an apparatus for loading a wheeled object into a vehicle, said apparatus being totally enclosed within the vehicle when in a storage position.

Another object of the invention is to provide a loading device for a wheelchair utilizing linkage means whereby the wheelchair may be raised, traversed toward the vehicle, crossing a vertical plane defining a maximum elevation, and lowered to a storage position, all while keeping the wheelchair horizontally oriented.

A further object of the invention is to provide an apparatus for loading a scooter-type wheelchair into the rear trunk compartment of a passenger automobile, such that the wheelchair may be raised up and over the sill of the trunk and lowered into the trunk.

An additional object is to provide a wheelchair loading apparatus having smooth operation during loading and unloading cycles.

Still another object of the invention is to provide a wheelchair loading apparatus utilizing a pair of spaced links, one of the links having a drive shaft driven by a motor, and having transmission means interconnecting the links so that both links are concurrently rotated.

Additional objects and advantages of the invention will become apparent as the following detailed description of the preferred embodiments is read in conjunction with the accompanying drawings which illustrate such preferred embodiments.

BRIEF DESCRIPTION OF THE DRAWINGS

FIG. 7 illustrates a plan view of an alternate embodiment of the loading platform having pivotal front wheel locating means.

FIG. 8 is a cross section taken along lines 8—8 in FIG. 7.

FIG. 9 is a cross-sectional view of the transmission means interconnecting link drive shafts, taken along lines 9—9 in FIG. 1.

FIG. 10 shows a side elevation view of the apparatus in an embodiment designed for loading into the side opening of a van or similar vehicle.

DETAILED DESCRIPTION OF THE PREFERRED EMBODIMENT

Figure 1:
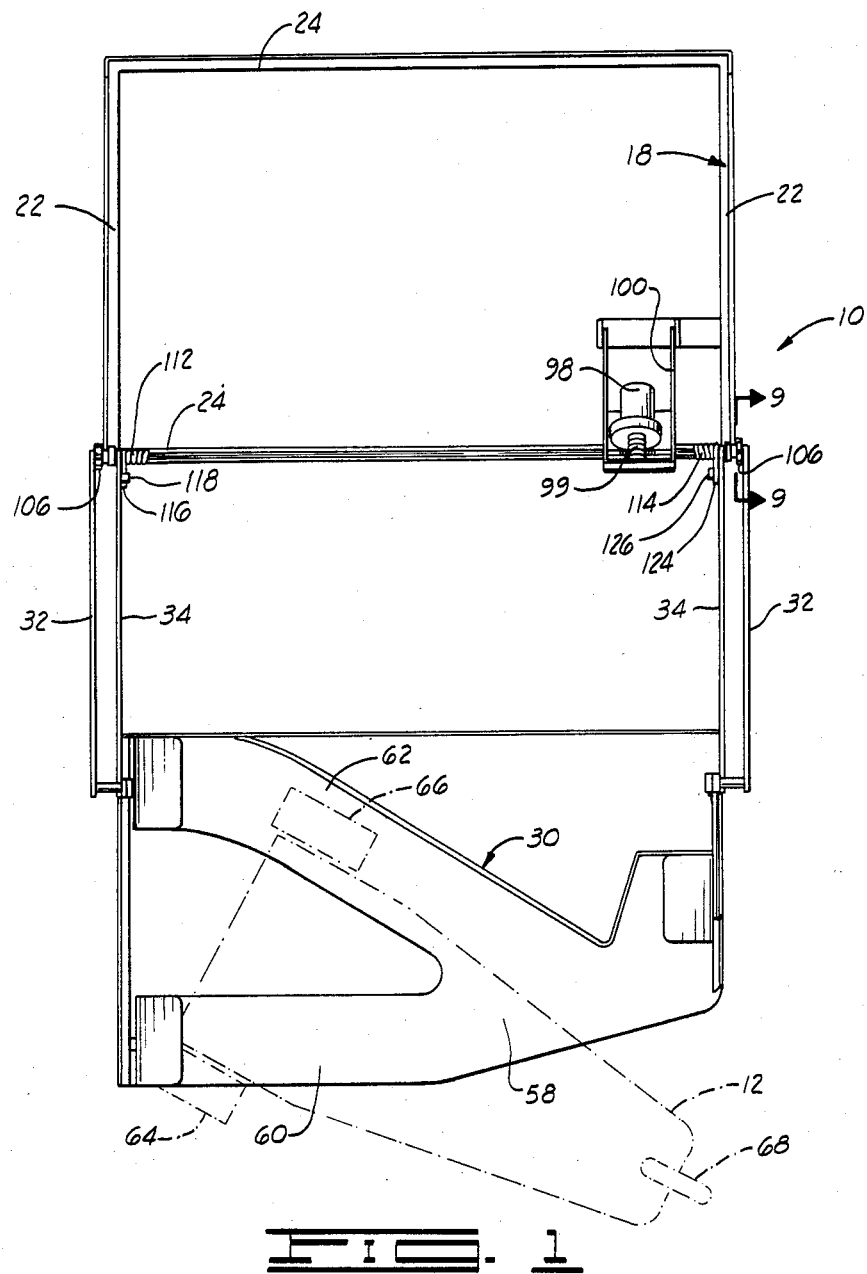
FIG. 1 shows a plan view of the wheelchair loading apparatus of the present invention, with a scooter-type wheelchair partially positioned thereon.

Referring now to the drawings, and more particularly to FIGS. 1–6, the wheelchair loading apparatus of the present invention is shown and generally designated by the numeral 10. The apparatus is designed for loading a scooter-type wheelchair 12 into a trunk 14 of a passenger automobile 16 or similar vehicle.

A frame 18 is adapted for mounting to a lower surface 20 of trunk 14. Frame 18 includes a pair of longitudinal members 22 and a pair of transverse members 24. Frame 18 also includes a pair of vertical members 26 at the rearwardmost portion of the frame and a pair of angularly disposed brace members 28.

A chair loading platform 30 is connected to frame 18 by linkage means in the form of a pair of upper links 32 and a corresponding pair of lower links 34.

Figure 4:
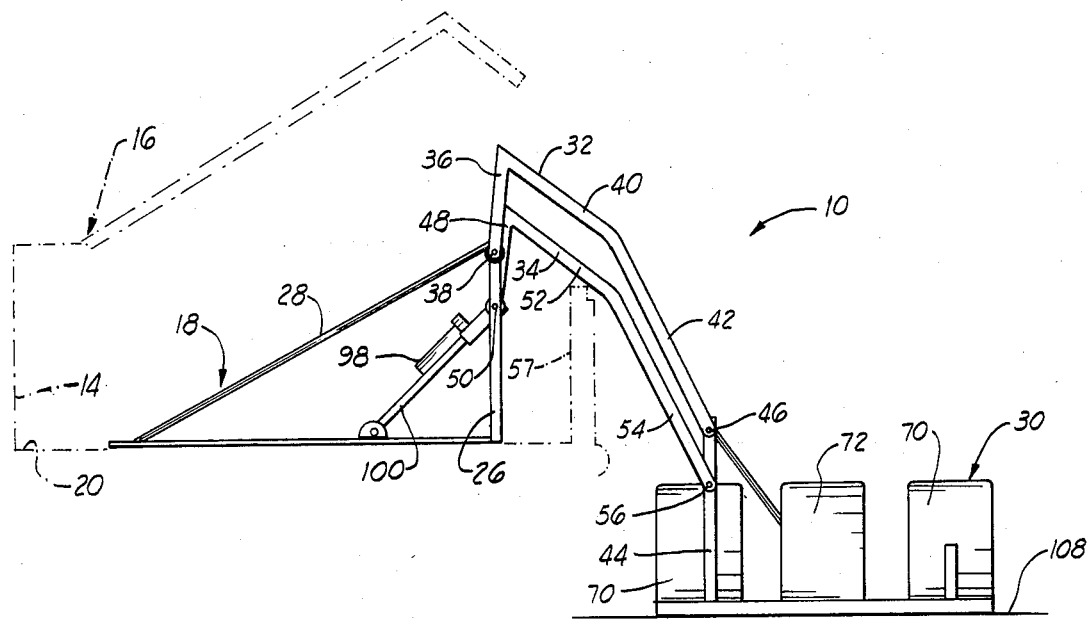
FIG. 4 illustrates a side elevation of an embodiment of the apparatus designed for loading into the trunk of a passenger automobile, the apparatus being in a loading or unloading position.

Each upper link 32 includes a frame end portion 36 pivotally connected to frame 18 at pivot point 38 and extending substantially upwardly when in the loading or unloading position of FIG. 4, an intermediate portion 40 extending rearwardly from the frame end portion at an acute angle with respect thereto, and a platform end portion 42 pivotally connected to vertical member 44 of platform 30 at pivot point 46. Lower link 34 has a corresponding frame end portion 48 pivotally connected to frame 18 at point 50, an intermediate portion 52, and a platform end portion 54 pivotally connected to vertical member 44 at point 56. This geometric configuration of links 32 and 34 provides clearance for sill 57 of trunk 14, and further facilitates a compact storage position within the trunk. Each link preferably has a substantially rectangular cross section.

Figure 2:
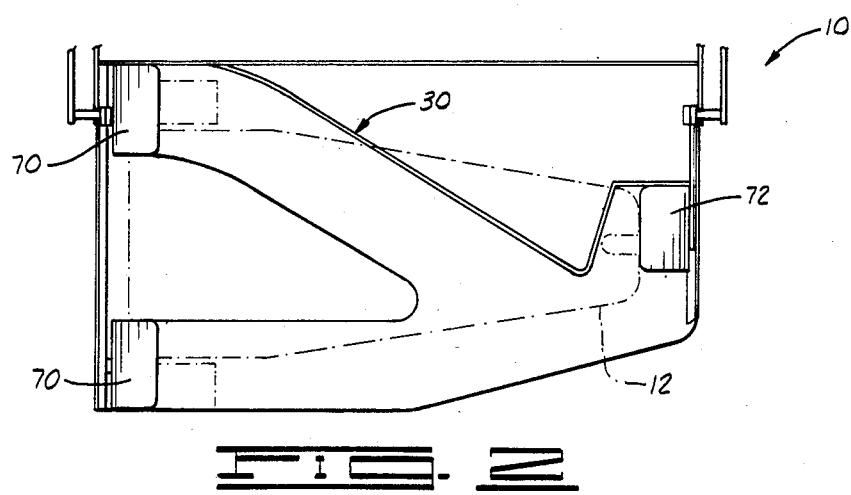
FIG. 2 shows a partial plan elevation with the wheelchair fully positioned thereon.

As shown in FIGS. 1 and 2, platform 30 comprises a substantially V-shaped track section 58 having a rearward leg 60 substantially perpendicular to a longitudinal axis of vehicle 16, and an angularly disposed forward leg 62. As shown in FIG. 1, a scooter-type wheelchair may be backed onto track section 58 such that the right rear wheel 64 travels along rearward leg 60 and the left rear wheel 66 travels on forward leg 62. By appropriate turning of front wheel 68, wheelchair 12 can be maneuvered into the loading position shown in FIG. 2 in which the wheelchair is substantially perpendicular to the longitudinal axis of the vehicle.

It should be noted that the apparatus is described herein for scooter-type wheelchairs having three wheels, but could easily be modified by those skilled in the art to be adapted for other configurations, such as a four-wheeled chair.

Figure 3:
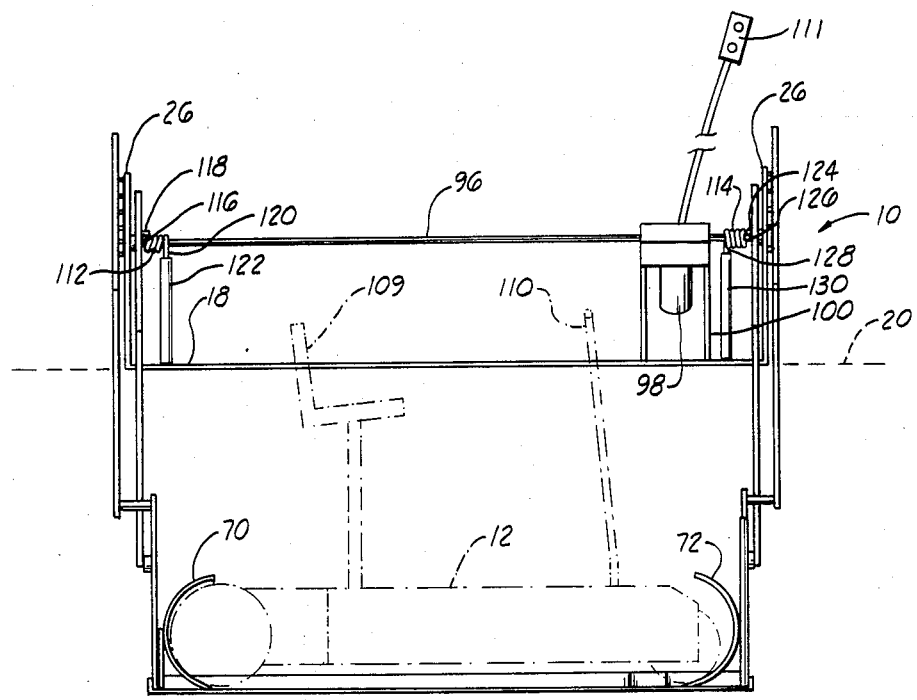
FIG. 3 is a transverse rear elevation view of the wheelchair loading apparatus with a scooter-type wheelchair positioned thereon.

Looking at FIG. 3, it can be seen that wheel location means are included in platform 30 in the form of a pair of upwardly extending curvilinear plates 70 concave toward, and dimensioned to fit, a circumferential surface of rear wheel 64 and 66, and a similar upwardly extending curvilinear plate 72 for front wheel 68. Thus, once wheelchair 12 is maneuvered into its loading position, it cannot roll in a transverse direction with respect to vehicle 16.

Referring now to FIGS. 7 and 8, an alternate embodiment of the front wheel location means of the platform is shown. The platform has a substantially V-shaped track section 74 with a transverse rearward leg 76 and an angularly disposed forward leg 78 similar to the first embodiment. Upwardly extending curvilinear plates 80 are positioned and dimensioned to correspond to the rearward wheels of the wheelchair, also as in the previously described embodiment. In the alternate embodiment, however, the front wheel of the wheelchair is rolled onto positioning plate 82 having a tilted loading or unloading position. Positioning plate 82 includes an upwardly extending restraining wall 84 which prevents the wheel from rolling off the positioning plate. Positioning plate 82 is pivotally attached to a horizontally disposed shaft 86. The tilted loading or unloading position of positioning plate 82 is shown in FIGS. 7 and 8 and with a loaded position of the positioning plate is shown in phantom lines. A pivotation stop 88 prevents overrotation of positioning plate 82 such that the loaded position is substantially horizontal. A torsion spring 90 biases positioning plate 82 towards its tilted loading or unloading position.

Horizontal shaft 86, and thus positioning plate 82, are also pivoted about a vertical shaft 92. Another torsion spring 93 biases positioning plate 82 in a counterclockwise direction, as viewed in FIG. 7, toward the loading or unloading position. It will be noted that shaft 86 is positioned off center with respect to positioning plate 82. That is, shaft 86 is closer to point 94 of positioning plate 82 which touches the ground than an opposite point 95, as seen most clearly in FIG. 8. Thus, as the front wheel of the wheelchair rolls onto the plate, it will rotate to the horizontal loaded position. As the vehicle is further moved on track 74, the front wheel will contact restraining plate 84 and force positioning plate 82 to pivot in a clockwise direction to the loaded position. This alternate embodiment is particularly adaptable to those wheelchairs which have relatively little freedom of movement of the front wheel thereof, and are thus less maneuverable.

Referring again to FIG. 3, lower links 34 are interconnected by a drive shaft 96. A reversible electric motor 98 powers drive shaft 96 through a right angle worm gear train 99. Links 34 are fixedly attached to drive shaft 96 such that, as motor 98 rotates the drive shaft, links 34 are rotated therewith. Motor 98 is attached to frame 18 at an angle with respect thereto by a bracket 100. This angled position of motor 98, and the use of worm gear train 99, represent a preferred embodiment which provides adequate clearance of the motor by platform 30 when it is positioned in trunk 14. However, it will be obvious to those skilled in the art, that other drive arrangements could also be utilized. For example, but not by way of limitation, motor 98 could power drive shaft 96 through a chain and sprocket drive system.

Referring now to FIG. 9, each upper link 32 has an individual drive shaft 101 fixedly attached thereto. Fixed to each shaft 101 is an upper sprocket 102 which is positioned above a corresponding lower sprocket 104 attached to each end of lower link drive shaft 96. A chain 106 interconnects each set of sprockets 102 and 104. Thus, as drive shaft 96 is rotated by motor 98 to rotate lower links 34, power is transmitted from sprockets 104 to sprockets 102 for rotating drive shafts 101 and upper links 32 concurrently with the lower links. Sprockets 102 and 104 and chain 106 are positioned between corresponding horizontally spaced upper links 32 and lower links 34.

Figure 5:
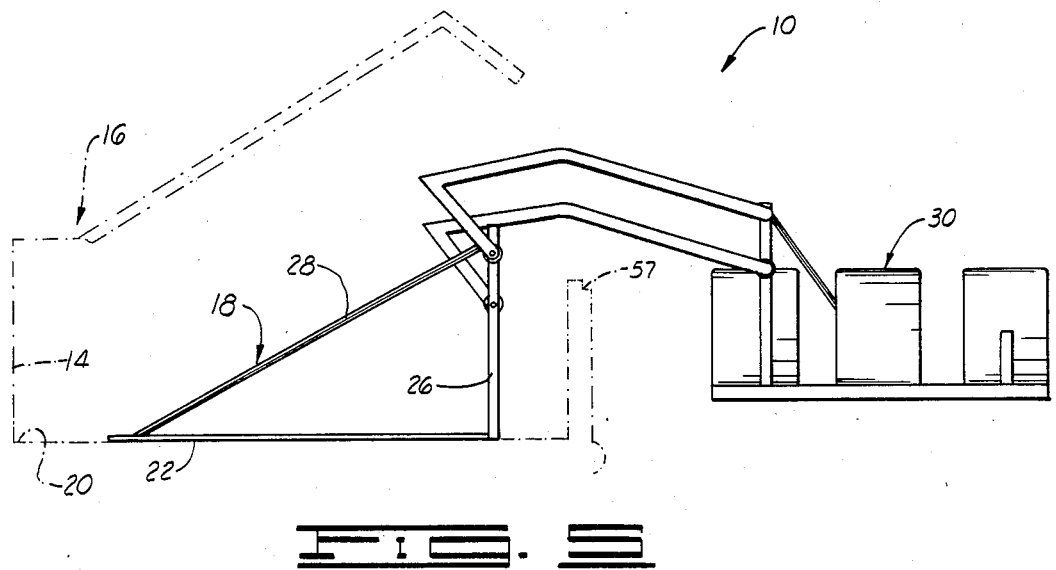
FIG. 5 is a side elevation view of the apparatus shown in FIG. 4 in an intermediate position during a loading or unloading cycle.
Figure 6:
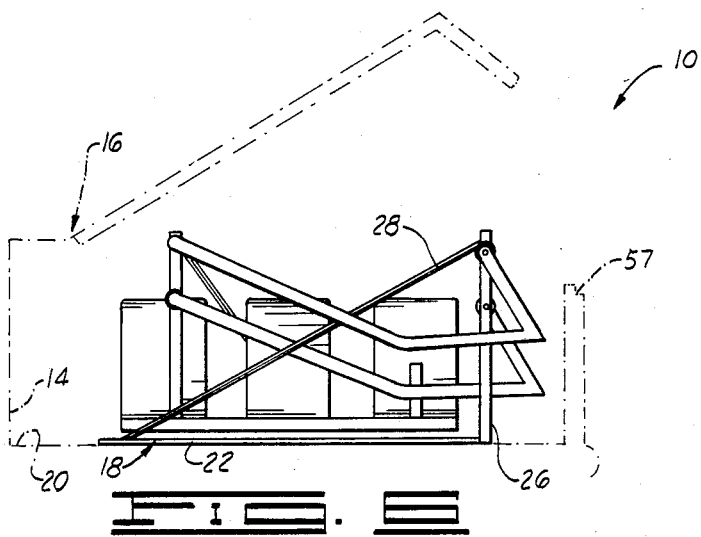
FIG. 6 is a side elevation view of the apparatus shown in FIGS. 4 and 5 when in a stored position within the trunk of an automobile.

Referring now to FIGS. 3–6, a loading, or unloading, cycle is illustrated. In the loading or unloading position illustrated in FIGS. 3 and 4, platform 30 is located adjacent ground surface 108, and wheelchair 12 may be positioned thereon as previously described. Seat 109 and steering control 110 are collapsed or removed as is appropriate for the particular model of wheelchair 12, and motor 98 is actuated by a remote control switch 111. As motor 98 rotates drive shaft 96 through gear train 99, links 32 and 34 are rotated as previously described such that platform 30 and wheelchair 12 positioned thereon are concurrently lifted and traversed toward trunk 14. An intermediate position of this cycle is illustrated in FIG. 5. It will be seen that as continued rotation of the links occurs, platform 30 will pass through a vertical plane defined by frame pivot points 38 and 50 at which point the platform reaches a maximum elevation, after which platform 30 is then lowered toward lower surface 20 of the trunk. Note that upper links 32 and lower links 34 must be horizontally spaced apart to accomplishe this motion. When the apparatus finally reaches the storage position as shown in FIG. 6, the trunk lid may be closed on the trunk.

A study of FIGS. 4 and 6 will show that the links rotate more than 180° during a loading cycle. Also, pivot points 38 and 50 are preferably spaced apart at a distance substantially the same as pivot points 46 and 56 such that platform 30 is maintained in a substantially horizontal position throughout the loading cycle. Preferably, motor 98 is a reversing motor, so that it will be obvious to those skilled in the art that by reversing the rotation thereof, an unloading cycle may be effected.

Referring to FIGS. 1 and 3, torsion springs 112 and 114 are mounted at opposite ends of drive shaft 96. One pigtail end 116 of torsion spring 112 bears against pin 118 on one of links 34. An opposite pigtail end 120 extends downwardly and is inserted into hollow tube 122 attached to frame 18. Similarly, a first pigtail end 124 of spring 114 bears against pin 126 on the other link 34. Pigtail end 128 of spring 114 extends downwardly and fits inside hollow tube 130 attached to frame 18.

When the apparatus is in the loading position, torsion spring 112 is positioned to cause a torque tending to rotate links 32 and 34 from the loading position to the storage position. Similarly, when the apparatus is in the storage position, torsion spring 114 is positioned to cause a torque which tends to rotate links 32 and 34 from the storage position to the loading position. Thus, torsion springs 112 and 114 provide a means for counterbalancing the weight of platform 30 and chair 12 which reduces the power required by motor 98 to load the apparatus. At the start of a loading cycle, torsion spring 112 acts to reduce the power required by the motor. As the apparatus moves toward an intermediate position, the springs 112 and 114 tend to counteract one another. At the end of the loading cycle, spring 114 acts to reduce the load on the motor. It will be obvious to those skilled in the art that the springs function correspondingly during an unloading cycle.

Another advantage to this torsional spring biasing is that any play in the moving parts is removed so that the apparatus operates in a smooth and predictable manner during loading and unloading cycles. In other words, sudden movement of the apparatus is eliminated. This feature is extremely important when the apparatus is operated by persons having motor control or central nervous system disorders. It is a medical fact that surprise or shock to such handicapped persons can have severe results that would not occur with persons without such disorders. A common result is involuntary spasticity which can last for many minutes. Thus, smooth operation is extremely important for handicapped persons operating the apparatus.

An alternate embodiment of the apparatus is illustrated in FIG. 10 as being adapted to load into the side opening (or rear opening) of a van 132 or similar vehicles. Because there is no trunk sill to accommodate, the apparatus can utilize substantially straight upper links 134 and substantially straight lower links 136 parallel to the upper links. A wheelchair 138 may simply be rolled onto a substantially horizontal platform 140. Wheelchair 138 may be of the scooter-type illustrated, the conventional collapsible type, or any other configuration which is positionable on platform 140. After loading, the apparatus and chair may be lifted, traversed to the vehicle opening, and lowered into a storage position in a manner similar to the trunk mounted embodiment, as shown in the phantom lines of FIG. 10. Again, platform 140 and wheelchair 138 loaded thereon reach a maximum height as they pass through a vertical plane extending from frame pivot points 142 and 144. In those cases where there is adequate vertical clearance through the opening in van 132, the apparatus may also be utilized to load wheelchair 138 into the vehicle with a person still seated thereon.

It can be seen, therefore, that the wheelchair loading apparatus of the present invention is well adapted to carry out the objects and attain the ends and advantages mentioned, as well as those inherent therein. While presently preferred embodiments of the invention have been described for the purposes of this disclosure, numerous changes in the construction and arrangement of parts can be made by those skilled in the art. All such changes are encompassed within the scope and spirit of this invention as defined by the appended claims.

What is claimed is:

1. Apparatus for loading a wheeled object into a vehicle, said apparatus comprising:
    a frame adapted for attachment to said vehicle;
    a platform for holding said wheeled object and having a loading position adjacent said vehicle and a ground surface and further having a storage position within said vehicle; and
    linkage means having a first portion pivotally connected to said frame and extending upwardly therefrom when said platform is in said loading position and having a second portion pivotally connected to said platform and extending rearwardly and downwardly from said first portion when said platform is in said loading position, whereby during a loading cycle, said platform and said wheeled object loaded thereon are raised from said loading position, traversed toward said vehicle, crossing a vertical plane defining a maximum elevation, and lowered to said storage position while horizontally oriented, said raising, traversing and lowering movements being a substantially continuous motion of said linkage means, said cycle being reversible for unloading.

2. The apparatus of claim 1 wherein said platform comprises:
a substantially horizontal track portion upon which said wheeled object may be rolled when said platform is in said loading position; and
wheel location means for locating a wheel of said wheeled object in a predetermined position and preventing undesired movement thereof when said object is loaded onto said platform.

3. The apparatus of claim 2 wherein said wheel location means is characterized by an upwardly extending curvilinear plate dimensioned to conform to a circumferential surface of said wheel.

4. The apparatus of claim 2 wherein said wheel location means includes a pivotable positioning plate having a tilted loading and unloading position such that a wheel may be rolled thereon and a substantially horizontal loaded position.

5. The apparatus of claim 4 wherein said positioning plate is further pivotable about a vertical axis.

6. The apparatus of claim 1 wherein said linkage means comprises:
an upper link wherein said first portion includes a frame end pivotally connected to said frame said second end includes a platform end pivotally connected to said platform; and
a lower link spaced from said first link wherein said first portion includes a frame end pivotally connected to said frame at a position below said frame end of said upper link and said second portion includes a platform end pivotally connected to said platform at a position below said platform end of said upper link.

7. The apparatus of claim 6 wherein said links rotate through an angle greater than 180° during a loading cycle.

8. The apparatus of claim 6 wherein said frame ends of said links are spaced apart on said frame at a distance substantially equal to that by which said platform ends of said links are spaced apart on said platform.

9. The apparatus of claim 6 further comprising:
a drive shaft attached to the frame end of one of said links whereby said link is rotatable by turning said shaft;
a drive shaft attached to the frame end of the other of said links; and
transmission means interconnecting said drive shafts whereby said links are rotatable concurrently.

10. The apparatus of claim 1 further comprising:
an electric motor; and
power transmission means connected between said motor and said linkage means for rotating said linkage means and performing said loading and unloading cycles.

11. The apparatus of claim 10 and further characterized as including:
control switching means to start said motor for a loading or unloading cycle; and
at least one limit swtich to automatically stop said motor when said platform reaches said loading position or said storage position during the respective cycle.

12. The apparatus of claim 10 wherein said motor is a reversing motor.

13. The apparatus of claim 1 further comprising counterbalance means to counterbalance said platform when loaded to reduce the power required to move said loaded platform during a loading or unloading cycle.

14. The apparatus of claim 13 wherein said counterbalance means comprises a torsion spring connected to said linkage means in said frame.

15. An apparatus for loading a wheeled object into a vehicle compartment defining an opening thereinto, said apparatus comprising:
a frame adjacent a lower surface of said compartment;
a platform for holding said wheels object and having a loading position adjacent said opening of said compartment and a ground surface and further having a storage position within said compartment adjacent said lower surface thereof;
a pair of first links disposed on opposite sides of said platform and said frame and extending through said opening of said compartment of said vehicle, each of said first links comprising:
a first link frame end pivotally attached to a portion of said frame adjacent said opening of said compartment and extending upwardly therefrom when said platform is in said loading position; and
a first link platform end pivotally attached to said platform and extending downwardly and rearwardly from said first link frame end when said platform is in said loading position;
a pair of second links vertically and horizontally spaced from said first links, said second links being disposed on opposite sides of said platform and said frame and extending substantially parallel to said first links, each of said second links comprising:
a second link frame end pivotally attached to said portion of said frame adjacent said opening of said compartment and extending upwardly therefrom when said platform is in said loading position;
a second link platform end pivotally attached to said platform and extending downwardly and rearwardly from said second link frame end when said platform is in said loading position;
a drive shaft interconnecting said first links; and
power transmission means interconnecting corresponding first and second links on each side of said frame;
whereby, as said drive shaft is rotated during a loading cycle, all of said links are correspondingly rotated, lifting said platform from said loading position, traversing the platform in a direction toward said compartment and lowering said platform into said compartment coming to rest in said storage position.

16. The apparatus of claim 15 wherein each of said links is of substantially rectangular cross section.

17. The apparatus of claim 15 further comprising an electric motor for driving said drive shaft.

18. The apparatus of claim 17 wherein said motor is a reversing motor.

19. The apparatus of claim 15 wherein said power transmission means is characterized by:
a first link sprocket attached to the frame end of each of said first links;

a second link sprocket attached to the second links; and a chain operatively interconnecting said first and second links sprockets.

20. The apparatus of claim 15 wherein said frame ends of said first and second links are vertically spaced apart on said frame at a distance substantially equal to that by which said platform ends of said links are vertically spaced apart on said platform.

21. The apparatus of claim 15 further comprising at least one torsion spring connected to said drive shaft for counterbalancing said platform when loaded to reduce the power required to move said loaded platform during a loading or unloading cycle.

22. The apparatus of claim 15 wherein said platform comprises:
   a substantially horizontal track portion upon which said wheeled object may be rolled when said platform is in said loading position; and
   wheel location means connected to said track portion for locating a wheel of said wheeled object in a predetermined position and preventing undesired movement thereof when said object is loaded onto said platform.

23. The apparatus of claim 22 wherein said wheel location means is characterized by an upwardly extending curvilinear plate dimensioned to conform to a circumferential surface of said wheel.

24. The apparatus of claim 22 wherein said wheel location means includes a pivotable positioning plate having a tilted loading and unloading position such that a wheel may be rolled thereon and rotatable to a substantially horizontal loaded position.

25. The apparatus of claim 24 further comprising a vertical shaft positioned adjacent said track portion;
   wherein said positioning plate further is pivotable about said vertical shaft.

26. An apparatus for loading a wheeled object into a vehicle rear compartment, said compartment defining a front portion, a rear portion and a longitudinal axis, and said apparatus comprising:
   a frame adjacent a lower surface of said rear compartment;
   a platform for holding said wheeled object and having a loading position adjacent a ground surface rearward of said vehicle and further having a storage position in said rear compartment;
   a pair of first links pivotally attached to said platform and a rear portion of said frame on opposite sides thereof, said first links extending longitudinally with respect to said vehicle and having a first portion directed upwardly from said frame and a second portion directed downwardly and rearwardly from said first portion when said platform is in said loading position whereby clearance is provided for said rear portion of said compartment;
   a pair of second links vertically and horizontally spaced from said first links and pivotally attached to said platform and a rear portion of said frame on opposite sides thereof, said second links extending substantially parallel to said first links and having a first portion directed upwardly from said frame and a second portion directed downwardly and rearwardly from said first portion when said platform is in said loading position whereby clearance is provided for said rear portion of said compartment;
   a drive shaft interconnecting said first links; and
   power transmission means interconnecting corresponding first and second links on each side of said frame;
   whereby, as said drive shaft is rotated during a loading cycle, all of said links are correspondingly rotated, lifting said platform from said loading position, traversing the platform in a forward direction with respect to said vehicle toward said rear compartment thereof and lowering said platform into said rear compartment for storage in said storage position.

27. The apparatus of claim 26 further comprising an electric motor for driving said drive shaft.

28. The apparatus of claim 27 wherein said motor is a reversing motor.

29. The apparatus of claim 26 wherein said power transmission means is characterized by:
   a first link sprocket attached to the frame end of each of said first links;
   a second link sprocket attached to the second links; and
   a chain operatively interconnecting said first and second links sprockets.

30. The apparatus of claim 26 wherein said frame ends of said first and second links are vertically spaced apart on said frame at a distance substantially equal to that by which said platform ends of said links are vertically spaced apart on said platform.

31. The apparatus of claim 26 further comprising a torsion spring connected to said drive shaft for counterbalancing said platform when loaded to reduce the power required to move said loaded platform during a loading or unloading cycle.

32. The apparatus of claim 26 wherein said platform comprises:
   a substantially horizontal track portion upon which said wheeled object may be rolled when said platform is in said loading position; and
   wheel location means for locating a wheel of said wheeled object in a predetermined position and preventing undesired movement thereof when said object is loaded onto said platform.

33. The apparatus of claim 32 wherein said wheel location means is characterized by an upwardly extending curvilinear plate dimensioned to conform to a circumferential surface of said wheel.

34. The apparatus of claim 32 wherein said wheel location means includes a pivotable positioning plate having a tilted loading and unloading position such that a wheel may be rolled thereon and rotated to a substantially horizontal loaded position.

35. The apparatus of claim 34 further comprising a vertical shaft positioned adjacent said track portion;
   wherein said positioning plate further is pivotable about said vertical shaft.

36. An apparatus for loading a wheelchair into a vehicle compartment having a lower surface and defining an opening thereinto, said apparatus comprising:
   a frame attachable to said rear compartment adjacent said lower surface thereof;
   a platform upon which said wheelchair may be rolled, said platform having a loading position adjacent a ground surface and further adjacent said opening of said compartment and defining a storage position within said compartment, said platform comprising:

a substantially horizontal track upon which said wheelchair may be rolled when said platform is in said loading position;

an upwardly extending wheel location plate for locating at least one rear wheel of said wheelchair on said track, said wheel location plate being of substantially curvilinear configuration and dimensioned to conform to a circumferential surface of said rear wheel; and wheel location means for locating a front wheel of said wheelchair;

a pair of first links positioned on opposite sides of said frame and having a frame end pivotally attached to said frame adjacent said opening of said compartment and further having a platform end pivotally attached to said platform, said first links extending outwardly through said opening of said compartment, wherein said frame end of each of said first links extends upwardly from said frame and said platform end is angularly disposed with respect to said frame end and extends downwardly and rearwardly therefrom when said platform is in said loading position;

a pair of second links positioned on opposite sides of said frame and having a frame end pivotally attached to a portion of said frame adjacent said opening of said compartment and further having a platform end pivotally attached to said platform, said second links extending outwardly through said opening of said compartment and substantially parallel to said first links, wherein said frame end of each of said second links extends upwardly from said frame and said platform end is angularly disposed with respect to said frame end and extends downwardly and rearwardly therefrom when said platform is in said loading position;

a first link drive shaft interconnecting said first links for rotation thereof;

a second link drive shaft connected to each of said second links for rotation thereof;

a first link sprocket mounted on said first link drive shaft adjacent each of said first links;

a second link sprocket attached to each of said second link drive shafts; and a chain interconnecting a corresponding first and second links sprocket and operatively engageable therewith;

whereby, as said first link drive shaft is rotated for rotating said first links during a loading cycle, said second link drive shafts are correspondingly rotated, thereby rotating said second links such that said platform is lifted from said loading position and traversed through said opening of said compartment and lowered into said compartment, stopping in said storage position, said loading cycle being reversible for unloading.

37. The apparatus of claim 36 wherein said wheel location means comprises a second, upwardly extending wheel location plate for locating said front wheel of said wheelchair on said track, said second wheel location plate being of substantially curvilinear configuration and dimensioned to conform to a circumferential surface of said front wheel.

38. The apparatus of claim 36 wherein said wheel location means comprises a pivotable positioning plate having a loading and unloading position in which said plate is tilted such that said front wheel may roll from said ground surface onto said positioning plate, and said positioning plate further defining a substantially horizontal loaded position.

39. The apparatus of claim 38 further comprising a vertical shaft positioned adjacent said track portion;

wherein said positioning plate is further pivotable about said vertical shaft when in said substantially horizontal loaded position.

40. The apparatus of claim 38 further comprising biasing means for biasing said positioning plate to said tilted loading and unloading positions.

41. The apparatus of claim 36 further comprising a reversing electric motor for driving said first link drive shaft during said loading and unloading cycles.

42. An apparatus for loading a wheeled object into a vehicle rear compartment, said compartment defining a front portion, a rear portion and a longitudinal axis, said apparatus comprising:

a frame adjacent a lower surface of said rear compartment;

a platform for holding said wheeled object and having a loading position adjacent a ground surface rearward of said vehicle and further having a storage position in said rear compartment;

a pair of first links pivotally attached to said platform and a rear portion of said frame on opposite sides thereof, said first links extending longitudinally with respect to said vehicle;

a pair of second links vertically and horizontally spaced from said first links and pivotally attached to said platform and a rear portion of said frame on opposite sides thereof, said second links extending substantially parallel to said first links, each of said first and second links comprising:

a frame end portion extending substantially upwardly when in said loading position;

an intermediate portion extending rearwardly from said frame end portion at an acute angle thereto; and a platform end portion extending rearwardly and downwardly from said intermediate portion at an obtuse angle thereto;

a drive shaft interconnecting said first links; and power transmission means interconnecting corresponding first and second links on each side of said frame;

whereby, as said drive shaft is rotated during a loading cycle, all of said links are correspondingly rotated, lifting said platform from said loading position, traversing the platform in a forward direction with respect to said vehicle toward said rear compartment thereof and lowering said platform into said rear compartment for storage in said storage position.

* * * * *

UNITED STATES PATENT AND TRADEMARK OFFICE
CERTIFICATE OF CORRECTION

PATENT NO. : 4,671,729

DATED : June 9, 1987

INVENTOR(S) : Robert E. McFarland

It is certified that error appears in the above-identified patent and that said Letters Patent are hereby corrected as shown below:

Column 1, lines 16 and 17, delete "attachement" and insert --attachment-- therefor; line 66, delete "linking" and insert --linkage-- therefor.

Column 4, line 7, delete "wheel" and insert --wheels-- therefor.

Column 5, line 34, delete "accomplishe" and insert --accomplish-- therefor.

Column 6, lines 21 and 22, delete "vehicles" and insert --vehicle-- therefor.

Claim 11, line 5, delete "swtich" and insert --switch-- therefor.

Claim 15, line 6, delete "wheels" and insert --wheeled-- therefor.

Signed and Sealed this

Seventeenth Day of November, 1987

Attest:

DONALD J. QUIGG

*Attesting Officer*  *Commissioner of Patents and Trademarks*